US006391271B1

(12) United States Patent
Debailleul

(10) Patent No.: US 6,391,271 B1
(45) Date of Patent: May 21, 2002

(54) PROCESS FOR THE TREATMENT OF WASTE CONTAINING ASBESTOS

(76) Inventor: Gérard Jean-Marie Debailleul, Kothemstraat 113, Schepdaal 1703 (BE)

( * ) Notice: Subject to any disclaimer, the term of this patent is extended or adjusted under 35 U.S.C. 154(b) by 0 days.

(21) Appl. No.: 09/516,235

(22) Filed: Mar. 1, 2000

Related U.S. Application Data

(63) Continuation of application No. 08/981,613, filed as application No. PCT/BE96/00056 on Jun. 10, 1996, now abandoned.

(30) Foreign Application Priority Data

Jun. 16, 1995 (BE) ............................................. 9500536
Nov. 6, 1995 (BE) ............................................. 9500911

(51) Int. Cl.$^7$ ............................ A62D 3/00; B09B 3/00; C01F 11/12

(52) U.S. Cl. .................................... 423/167.1; 588/254

(58) Field of Search ....................... 423/167.1; 588/254, 588/261, 242, 900; 422/292

(56) References Cited

U.S. PATENT DOCUMENTS 3,914,184 A 10/1975 Harada et al. ........... 423/167.1
4,996,999 A 3/1991 Bartimote ................... 134/111
5,562,585 A 10/1996 Godesberg .................. 588/249

FOREIGN PATENT DOCUMENTS

| | | |
|---|---|---|
| JP | 1-171685 | 10/1989 |
| WO | WO-A-91-00123 | 1/1994 |
| WO | WO-A-94-08661 | 4/1994 |

OTHER PUBLICATIONS

Database WPI Section Ch. Week 8993, Derwent Publications Ltd. London, GB, Class L02, AN 89–237447 & JP–A–1 171 685 (Mitsui Eng. & Shipbuild) Jul. 6, 1989.

Chemie–Technik, vol. 23, No. 1, p. 20, XP 000426523; “Chemische zersetsung von abest”, Jan., 1994.

*Primary Examiner*—Steven Bos
(74) *Attorney, Agent, or Firm*—Piper Marbury Rudnick & Wolfe LLP; Jerold I. Schneider

(57) ABSTRACT

A method for processing asbestos-containing waste from a waste generating site, wherein the waste is transferred from the site to a processing reactor without exposing the waste to an external environment, a basic reaction solution is fed into the reactor, a reaction is carried out to give a substantially fiber-free reaction product, and the reaction product is separated into a solid phase and a liquid phase. The separated liquid phase is optionally recycled to form the basic reaction solution and the separated solid phase is optionally recovered to enable upgrading thereof.

3 Claims, 6 Drawing Sheets

PROCESS FOR THE TREATMENT OF WASTE CONTAINING ASBESTOS

CROSS-REFERENCE TO RELATED APPLICATIONS

This application is a continuation of U.S. application Ser. No. 08/981,613, filed Mar. 16, 1998, now abandoned, which is a national stage application of PCT/BE96/00056, filed Jun. 10, 1996.

BACKGROUND OF THE INVENTION

The present application relates to a process for the treatment of waste containing asbestos, originating from a site generating such waste, including a reaction by digestion of the waste with a basic solution until a reaction product substantially without asbestos fiber is obtained.

The harmful effects of asbestos in the human respiratory tract are well known. Most of the countries in the world make provisions for stripping down asbestos, in particular in building construction. At present, when stripping down is carried out, the asbestos is stored in double bags and is subsequently transported to treatment centers.

The largest treatment centers carry out one of two alternate solutions, either (a) coating with hydraulic binders and dumping of the product obtained, or (b) incineration by vitrification at very high temperature.

In both cases, there are big disadvantages. For example, there are the hazards linked with the transport and storage, during which the smallest incident can result in pollution of the environment. Furthermore, alternate solution (a) noted above merely postpones the problem, since it does not destroy the asbestos fibers; alternate solution (b) noted above is very costly, and both solutions (a) and (b) noted above do not provide for any reclaiming of the products resulting from the treatment.

Treatments with acids are also known, which have the disadvantage of polluting the environment with other hazardous wastes.

Lastly, there are known treatments of waste containing asbestos in alkaline medium.

WO-A-03/18867 describes a process in which the waste is ground very finely in the presence of at least one substance which releases $OH^-$ ions in water, so as to form an aqueous suspension which is optionally subsequently transferred to an autoclave and treated at elevated temperature and pressure. The process described in WO-A-03/18867 has the disadvantage of a preliminary stage of very fine grinding, which requires a very powerful, and hence stationary, plant. The process therefore does not solve the problems which are inherent in the transport and storage of waste, and appears to be very costly. Furthermore, nothing is provided with regard to the fumes and liquid effluents which are released during the process and which, in their turn, run the risk of polluting the environment.

WO-A-94/08661 describes a treatment process as indicated at the beginning. The only aim of this process is to produce waste that can be tipped on a dump without the hazards inherent to asbestos. The only plant described for carrying out this treatment is a stationary treatment center, of large size, which therefore does not provide any solution to the problems of transport and storage of waste containing asbestos. Finally, during the treatment the waste is subjected to a compacting operation which is costly in energy, before being introduced into the treatment chamber.

SUMMARY OF THE INVENTION

The objective of the present invention is to provide a process and a plant which avoid the above-mentioned disadvantages and which permit treatment of the waste on the site which generates such waste. A site which generates waste should be understood to mean not only a building in which all the components containing asbestos are stripped down, but also, for example, a refuse depot where bags containing asbestos have been previously accumulated. It is therefore desirable that the plant should be of small size and transportable.

A further objective of the invention is to avoid any risk of pollution between the waste generating site and the reactor which will treat the waste, that is to say, to avoid the risks of bagging of the waste and of the transport of these bags towards a distant treatment center. The bagging of structural debris is an awkward operation and very frequently results in the bags being perforated, which subsequently allows asbestos to be spread around in the atmosphere outside the site.

Another objective of the invention is to prevent as much as possible any escape of product involved in the treatment, insofar as it still contains asbestos fibers. The products resulting from the treatment will be advantageously either recycled or are suitable for being reclaimed.

Finally, another objective of the invention is to avoid any grinding, crushing or compacting of the waste prior to the entry into the reactor and hence an introduction into the latter, without any sorting, of substrates laden with asbestos.

These problems are solved, in accordance with the invention, by a process as generally described as including various combinations of the steps of, and the apparatus for:

- a transfer of the waste containing asbestos from the generating site into the interior of a treatment reactor, without the waste being in contact with an external medium;
- feeding the reactor with basic digestion solution until a reaction product is obtained, substantially without fibers;
- separation of the reaction product into a solid phase and a liquid phase;
- recycling of the liquid phase resulting from the aforementioned separation, and optionally of a recycling gaseous medium drawn off from the reactor after the digestion, in order to form the basic digestion solution;
- recovery of the solid phase resulting from the separation, with a view to an optional reclaiming; and
- discharge out of the reactor of a small quantity of irrecoverable waste containing no asbestos fibers.

Furthermore the above-mentioned stages are carried out in a "closed" circuit without any possible outward release of asbestos fibers, with any product resulting from this circuit being substantially devoid of any asbestos fiber.

In accordance with one advantageous embodiment of the invention, the transfer of the waste containing asbestos takes place in a closed, removable receptacle and the process additionally includes, during or after the transfer, an external washing of the receptacle with a washing liquid. This makes it possible to eliminate the asbestos dust which may have been deposited on the receptacle during its presence at the waste generating site, and hence not to contaminate the location, near the site, where the basic digestion is to take place. The water from washing the receptacle is preferably recycled into the formation of a basic digestion solution, and this prevents any pollution of the environment when the closed receptacle leaves the place which generates waste.

In accordance with a particularly advantageous aspect of the invention, the removable receptacle used for the above-mentioned transfer is also the reactor in which the digestion reaction takes place. In this case, there is therefore no risk of pollution by the asbestos during the transfer from one receptacle into another; the unsorted waste is introduced directly into the reactor at the waste generating site itself.

According to one embodiment of the invention the digestion reaction is performed with the basic digestion solution at a temperature of the order of 175° to 220° C. and at a pressure of approximately 3 to 10 kg/cm$^2$. More preferably, the digestion reaction is performed with the basic digestion solution at a temperature in the order of 190° to 220° C. and at a pressure of approximately 3 to 5 kg/cm$^2$.

According to an alternate embodiment of the invention the digestion includes:

a first digestion in the reactor with the basic digestion solution at a temperature which makes it possible to obtain a product of disassociation of the asbestos fibers from the other waste, while maintaining a low pressure in the reactor;

a separation of the above-mentioned product of disassociation into a solid phase which is concentrated in volume in relation to the waste containing asbestos transferred into the reactor, and a liquid phase;

recycling of the liquid phase for the formation of the basic digestion solution;

introduction of the solid phase concentrated in volume, originating from the product of disassociation, into an additional reactor;

a second digestion, in the additional reactor, of this solid phase concentrated in volume with the basic digestion solution, at a temperature and a pressure which are sufficiently elevated to obtain the said reaction product without fibers; and cooling of the said reaction product before its above-mentioned separation.

This method of treatment makes it possible, in a first stage, to reduce the bulk of the waste containing asbestos. For example, asbestos waste from flocking is generally, when dismantled, in the form of wadding whose specific weight is of the order of 150 to 300 g per liter. During the first digestion, performed at a relatively moderate temperature, it is possible to employ reactors such as autoclaves, which are much less heavy and above all less costly because of the low pressure used. In the second digestion stage, the solid phase which is treated has a volume which has been reduced by 70% in relation to the volume of the waste used in the first digestion stage. The second reactor employed can then subject this solid phase to an elevated temperature which is sufficient to make the asbestos fibers disappear without necessarily having to reach an exaggeratedly elevated pressure in this second reactor. The yield can thus be increased, while the cost of the removable reactors is drastically reduced.

Other embodiments of the process in accordance with the invention are described herein.

In accordance with the invention the problems presented have also been solved with an apparatus for implementing the process in accordance with the invention and the apparatus is fully described herein.

BRIEF DESCRIPTION OF THE DRAWINGS

Other details and special features of the invention will emerge from the description given below, no limitation being implied, and with reference to the appended drawings. In the various drawings, identical or similar components are denoted by the same reference numeral.

DETAILED DESCRIPTION OF THE INVENTION

Figure 1:
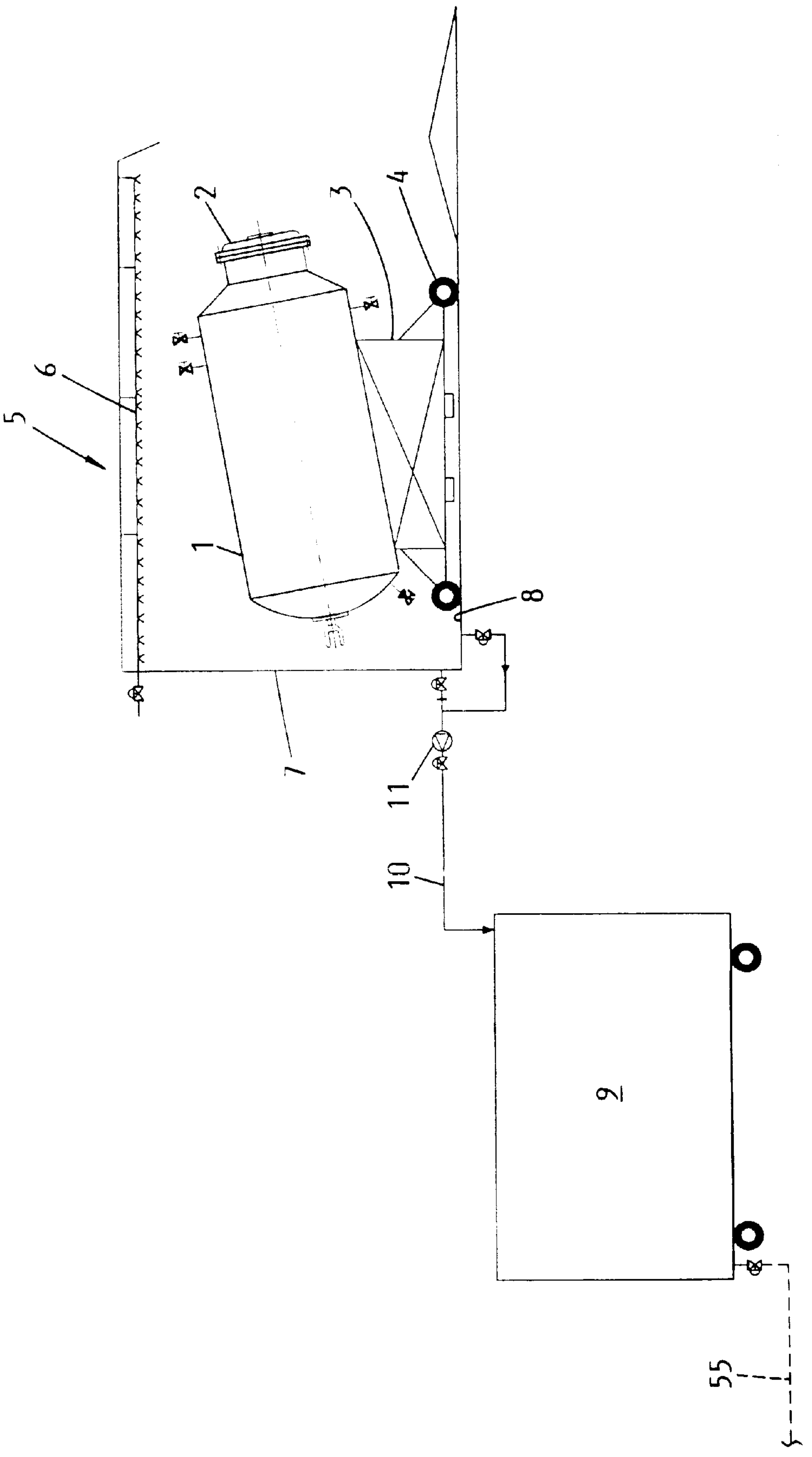
FIGS. 1 to 3 together show diagrammatically a treatment plant in accordance with the invention.
Figure 2:
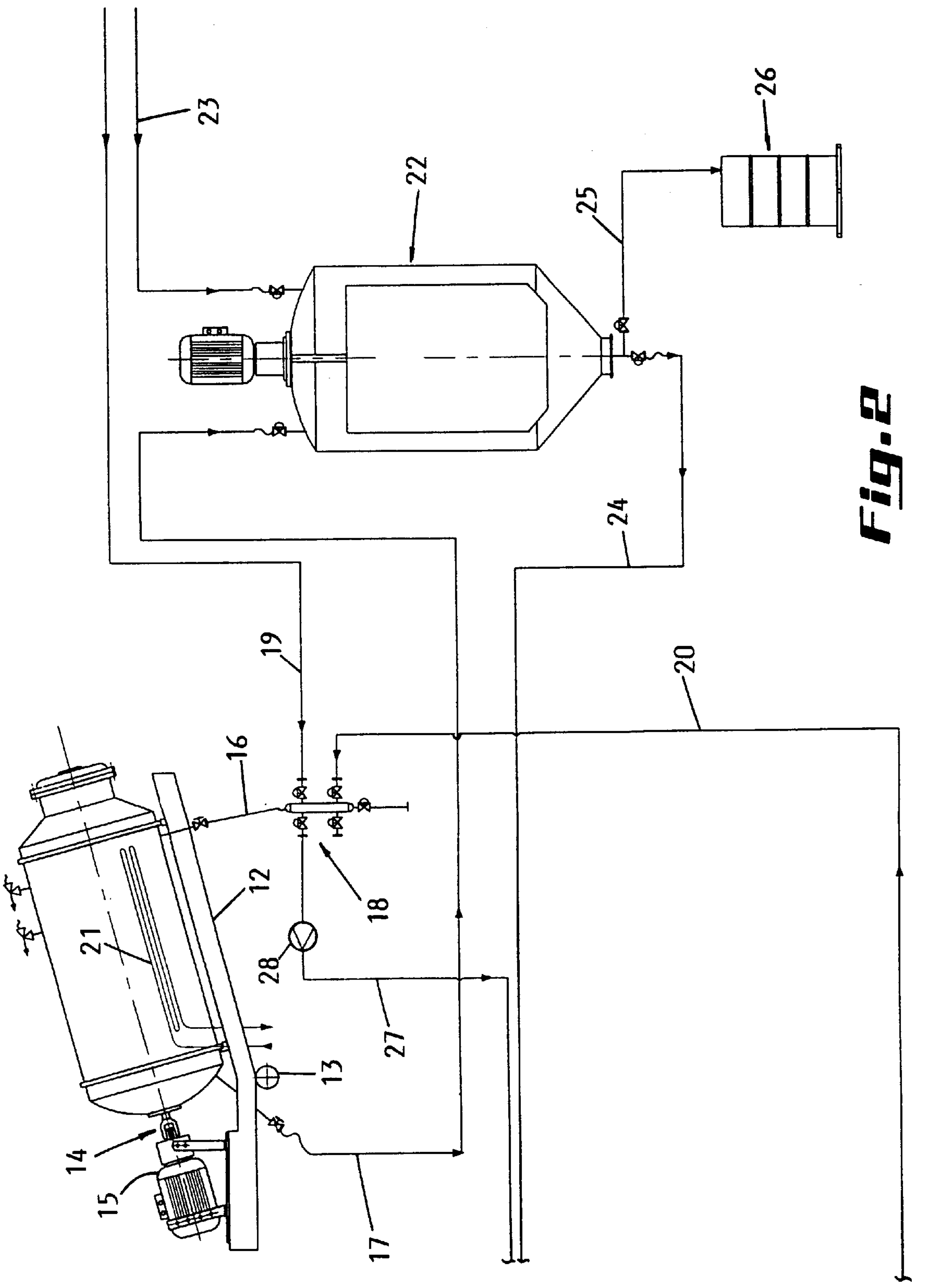
Figure 3:
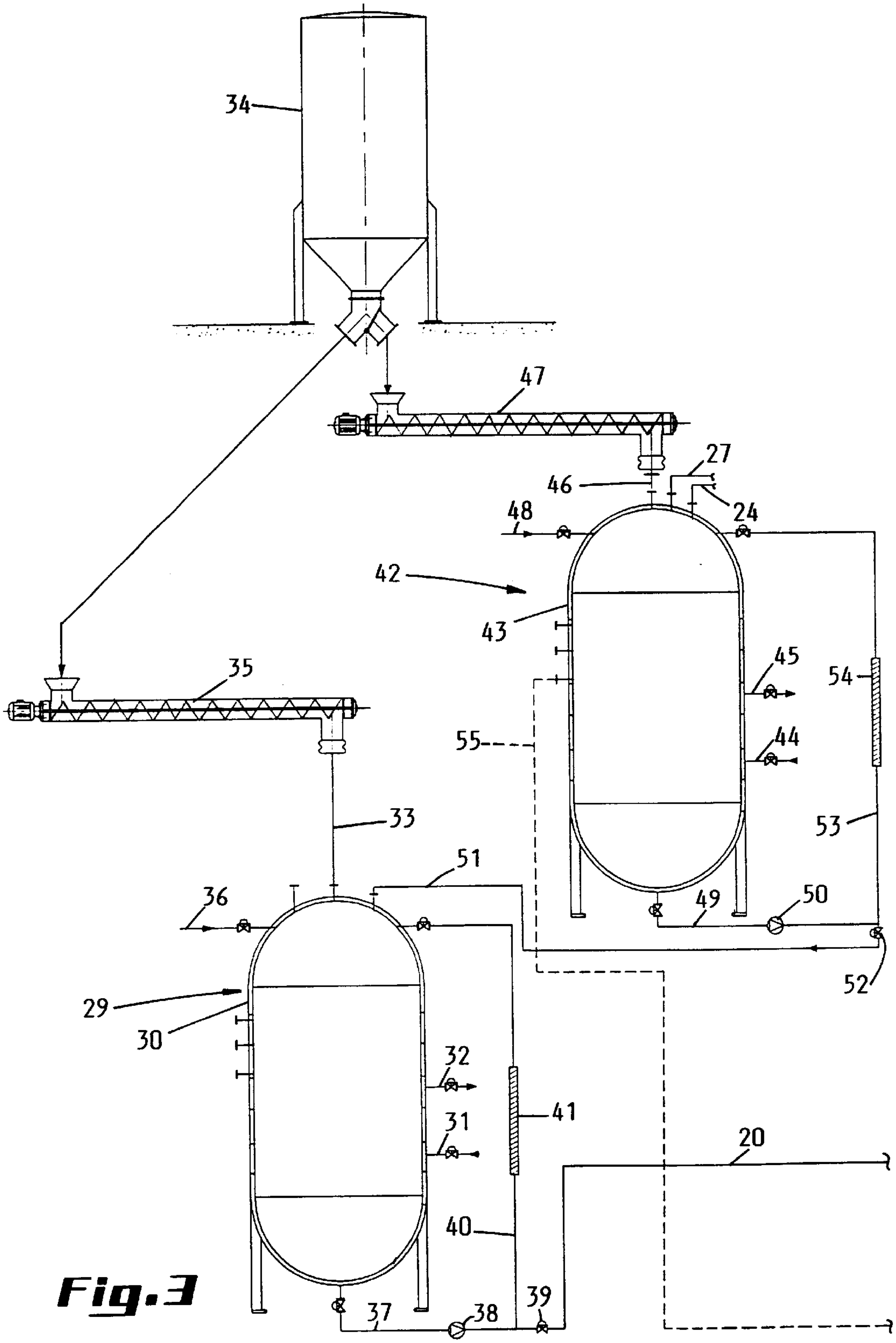

The plant or apparatus illustrated in FIGS. 1 to 3 includes a reactor 1 in the form of an autoclave which can be shut off in a leak proof manner with a lid 2 capable, for example, of being closed. This reactor is designed to be capable of withstanding internal pressures of up to 10 kg/cm$^2$. The reactor can be moved on a trolley 3 which is provided with rollers 4. This reactor is sized so as to be capable of entering buildings and hence to be capable of passing through doors and entering a lift. This allows the reactor 1 to be filled with waste stripped down in the building, containing asbestos fibers, "on-site" without any preliminary sorting or grinding of the waste. Once the reactor is filled with the actual waste at the generating site, and hence without handling of bags, the reactor is taken out of the building where the waste is stripped down as described herein.

The reactor is then preferably brought to a spraying station 5 (FIG. 1) which is provided with an upper spraying rack 6 fed with water, preferably under pressure, and with a cabin 7, the floor of which is arranged as a collection pond 8 for the aqueous wash which is then laden with dust that has accumulated on the reactor during its movement within the site which generates waste. The dust itself probably contains asbestos fibers. The collected aqueous wash is sent to a collecting tank 9 through the intermediary of an exit conduit 10 provided with a pump 11. In the illustrated embodiment, the tank 9 itself is mounted on rollers or wheels so as to be capable of being moved.

FIG. 2 shows the part of a plant or apparatus in accordance with the invention in which the content of the reactor is subjected to a digestion with a basic aqueous solution. The reactor 1 has been transferred from the trolley 3 onto a support 12 capable of tilting about a horizontal shaft 13. The output shaft of a rotary motor 15 is connected via a quick coupling 14 to a stirrer installed in a known manner at the bottom of the reactor. A motor, not shown, allows the shaft 13 to be rotated on its axis and the reactor to be tilted. All these measures permit an appropriate stirring of the contents of the reactor during the digestion.

Quick connection couplings allow the reactor 1 to be connected to an upper conduit 16 and to a lower conduit 17, each of which can be shut off with a valve means.

In the illustrated example, the upper conduit 16 is in communication with a multiple-way valve 18. According to the opening selected by control, the valve 18 allows rinse water to enter the reactor from the conduit 19 and/or basic digestion solution to enter the reactor from the conduit 20. Electrical heater elements 21 are provided inside the reactor and are connected to a source of current when the reactor is in place on the support 12.

The digestion with the basic aqueous solution can therefore take place in the reactor 1 without any possible outward release of asbestos fibers. The basic digestion solution may be, for example, an aqueous solution of an agent generating $OH^-$ ions, like alkaline or alkaline-earth bases, about 35M NaOH in flake or dry form, dissolved in water, to achieve about 70% (2:1) flakes in water. The digestion preferably takes place at a temperature of 175° to 220° C. and at a pressure of 3 to 10 kg/cm$^2$, and more preferably at a temperature of 190° to 220° C. and at a pressure of 3 to 5 kg/cm$^2$ for a period of 20 to 30 minutes, advantageously with slow stirring, possibly intermittently. Preferably, and in order to minimize risk, the digestion reaction further takes place under isobaric and isochoric conditions, which promote a depolymerization of the macronanions of silicon and aluminum, and a replacement of the cations. After the digestion there are substantially no more asbestos fibers in the reaction product, which is of pasty consistency. This reaction product is taken out of the reactor 1 via the lower conduit 17, after opening of the corresponding valve, and is brought to a running centrifuge 22. This transfer may be followed by an internal rinsing of the reactor by addition of rinsing water from the conduit 19.

In the centrifuge, fresh or rinsing water may also be supplied by a water entry conduit 23. The centrifuge makes it possible to separate a liquid phase and a solid precipitate in the pasty product. The liquid phase, consisting chiefly of water and of digestion base, is recovered at the bottom of the centrifuge, to be recycled via a recycling conduit 24. The solid precipitate is sent via the exit conduit 25 into a trough 26 from which a reclaiming of this precipitate can later take place.

Depending on the nature of the asbestos treated, various solid materials will be obtained. In the case of amphiboles, a ferrate (complex iron hydroxide) precipitate will be obtained which can be adopted as a function of its utilization, in particular as flocculent for heavy metals in industrial effluents or in hydrometallurigical solutions. In the case of other types of asbestos, like chrysotiles, the precipitates will be, for example, mixed into a cement-based composition or introduced as adjuvants into refractory materials.

When it is being closed at the waste generating site, the reactor 1 contains, in addition to the waste introduced, air highly laden with dust and hence with asbestos fibers. During the digestion these particles in suspension are washed and digested to the same extent as the solid waste, and the asbestos fibers which were in suspension are therefore also destroyed.

After closure of the conduit 17, when all the pasty mass forming the reaction product has left the reactor, the upper conduit 16 is opened again, after the three-way valve 18 has closed the conduits 19 and 20. A third part of the three-way valve 18 is then opened, which communicates with a gas conduit 27 fitted with a vacuum pump 28. The gaseous medium present in the reactor 1 is then sucked into the conduit 27. When a slight pressure reduction has been established in the reactor 1, the valve 18 toward the conduit 27 is closed and then the communication between the conduit 16 and the reactor 1 can be shut off.

The lid 2 of the reactor 1 can then be opened without any danger of pollution of the environment. The debris which have been introduced with the asbestos waste at the generating site, for example bricks, pieces of wood and the like, can then be tipped out by tilting the reactor and optionally by scraping the interior of the reactor. This debris, completely devoid of asbestos fibers, can then be conveyed to a dump or another destination.

The part of the plant or apparatus used for the formation of the basic digestion solution in accordance with the invention is shown in FIG. 3.

In the example illustrated the plant includes a solution preparation vessel 29 capable of withstanding a pressure of 10 kg/cm$^2$ and capable of being heated, for example by a heating jacket 30 in which a heat exchange fluid, such as oil, circulates. The heat exchange fluid enters the jacket 30 at 31 and leaves it at 32.

The caustic soda flakes are fed at the top at 33 into the vessel 29 from a silo 34 and by flowing on a screw conveyor 35.

Fresh or rinse water can be supplied into the vessel 29 through the entry conduit 36. An exit conduit 37 for the basic digestion solution allows the latter to be taken from the bottom of the vessel 29 with the aid of a pump 38. This exit conduit 37 is in communication with the previously mentioned conduit 20 (see FIG. 2) via a valve 39 which is open when the reactor 1 is to be fed with basic digestion solution. When the valve 39 is closed the basic digestion solution is recycled to the top of the vessel 29 via a bypass 40, with the aid of a static mixer 41. In this vessel, the basic solution is brought to the desired concentration, at a temperature close to boiling, for example 120° C.

In the example illustrated, the plant advantageously also includes an equalizing vessel 42 for the basic digestion solution. This vessel is preferably capable of withstanding a pressure of 5 kg/cm$^2$, and is capable of being slightly heated, for example with a heating jacket 43 in which a heat transfer fluid, again such as oil, circulates. The heat transfer liquid enters the jacket 43 at 44 and leaves it at 45.

The caustic soda flakes are fed through the top at 46 into the vessel 42 from the silo 34 and by flowing through a screw conveyor 47.

Fresh or rinsing water can be introduced into the vessel 42 via the entry conduit 48. An exit conduit 49 for the basic equalizing solution allows the latter to be taken from the bottom of the vessel 42 with the aid of a pump 50. This exit conduit 49 is in communication with a feed conduit 51, via a valve 52. This feed conduit 51 makes it possible to introduce a basic equalizing solution at the top of the preparation vessel 29 and thus to obtain a basic digestion solution of uniform composition. When the valve 52 is closed the basic equalizing solution is recycled to the top of the vessel 42 by a bypass 53 with the aid of a static mixer 54.

In this vessel 42 the liquid phase separated off in the centrifuge is brought by the conduit 24 (see FIG. 2), and this makes it possible to recover a considerable part of the basic digestion solution which has already been used. The conduit 27, through which the gas mixture from the reactor 1 leaves after the digestion, itself also opens into the top of the equalizing vessel 42. Finally, the collecting tank 9 (see FIG. 1) can also be brought into communication with the vessel 42, via the conduit 55, in order to introduce it into the external aqueous wash of the reactor 1. In accordance with another embodiment, it is also possible to provide for the internal aqueous wash of the reactor to be recycled directly into the recycling conduit 24 without passing through the centrifuge. In this mixture made up of liquids and of gases from various sources, the digestion base is dissolved at a low temperature until the saturation threshold is reached.

Figure 4:
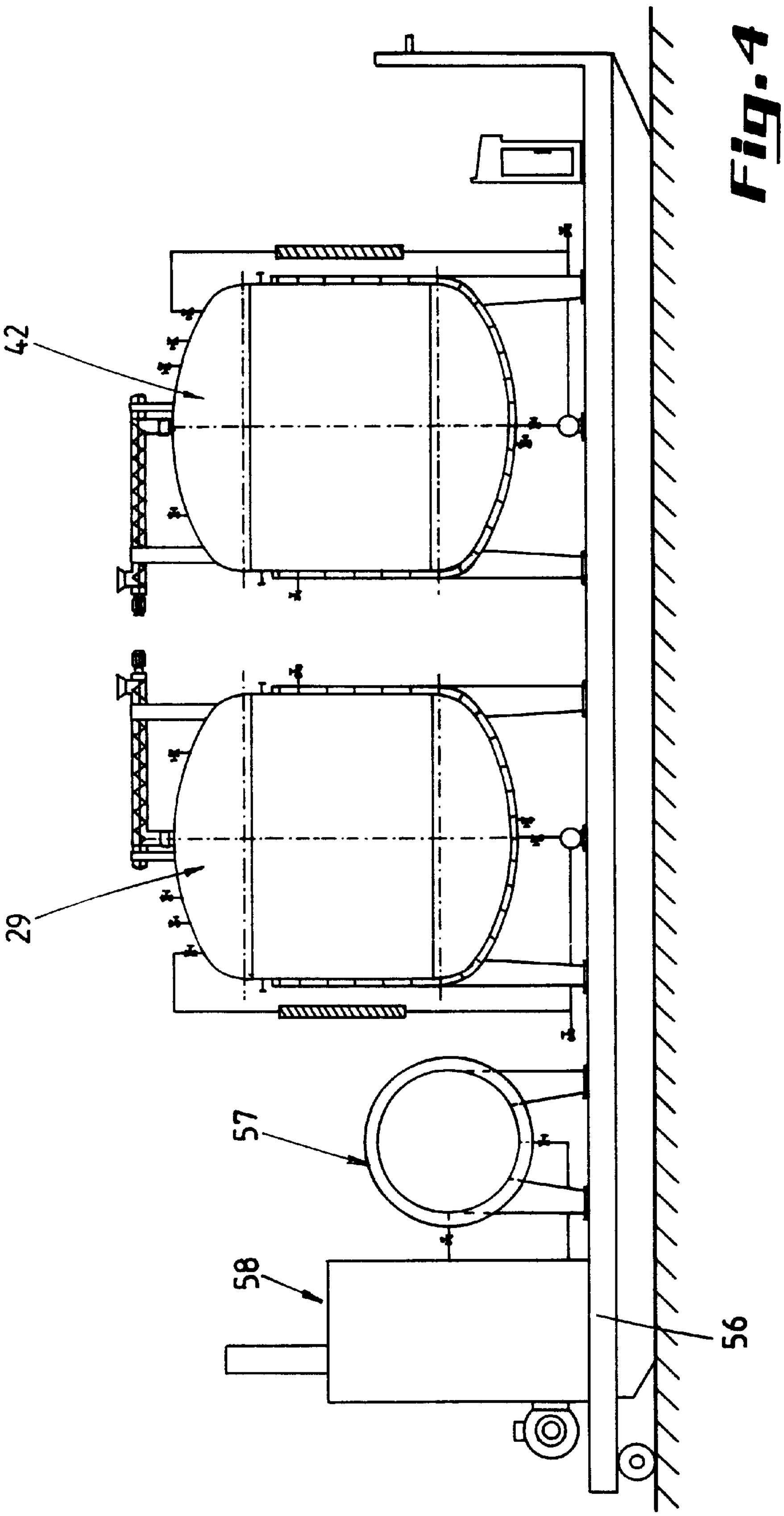
FIG. 4 shows a partially sectioned, diagrammatic view of a part of the plant in accordance with the invention on a base plate which can be transported on a trailer.

As can be ascertained, in this plant or apparatus all the reactants are introduced into a circuit in a manner which seals them off from the atmosphere, and all the liquid and gaseous effluents are recycled. Only a reclaimable solid reaction product and debris which cannot be digested by the basic digestion solution leave the process used in this plant. These two output products do not contain any asbestos fibers after analysis FIG. 4 shows the arrangement on a base plate 56, which can be carried by a trailer, of the parts for forming the basic digestion solution of the plant. The vessels 29 and 42 of FIG. 3 are supported on the base plate 56. Beside these vessels there is a common device for heating the heat exchange fluid with a heat exchange fluid tank 57 and a boiler 58.

Figure 5:
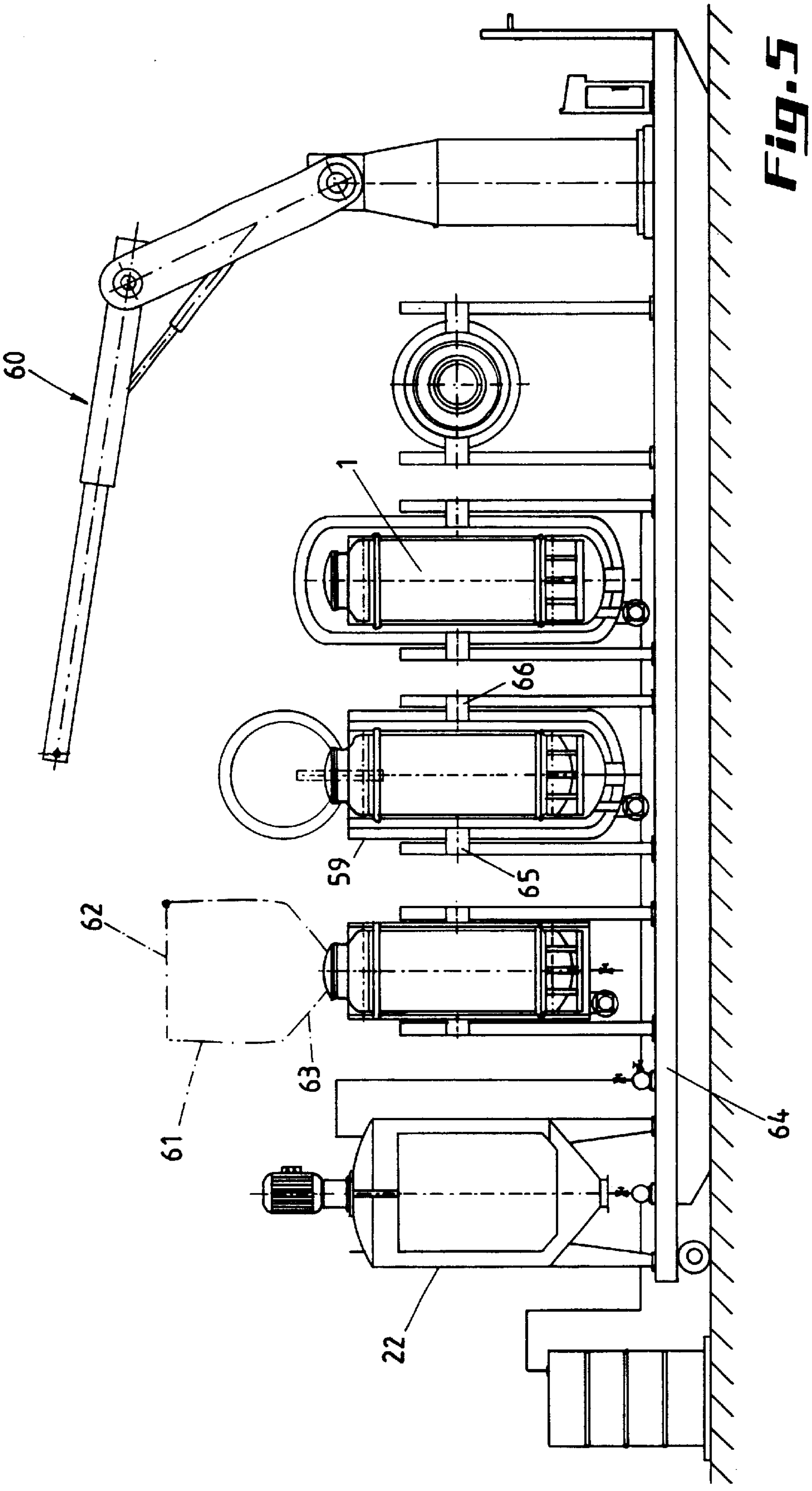
FIG. 5 shows a partially section, diagrammatic view of another part of the plant in accordance with the invention on another base plate which can be transported on a trailer.

FIG. 5 shows a battery of reactors 1 which are supported on a base plate 64 which can be carried by a trailer. In this embodiment the reactors are introduced into a heat enclosure 59, the upper part of which can be opened for introducing or withdrawing the reactor 1. This operation is performed with the aid of a lifting device 60 known per se. The heated enclosure 59 is supported on two coaxial shaft ends 65 and 66 so as to be able to rotate about their axis. An agitation of 40 to 50 revolutions per minute is, for example, favorable.

The reactor on the left of FIG. 5 is fed by a removable receptacle in the form of a trough 61, the upper wall 62 of which can be opened for the introduction of waste at the generating site. The bottom of this trough 61, designed to be transportable and movable between the generating site and the transportable treatment unit in accordance with the invention, is made up of a hopper 63 which can be shut off by a slide valve, not shown. Similarly, the upper opening of the reactor is then closed by a lid with a corresponding slide valve. When both slide valves are open the waste from the trough 61 can flow into the reactor 1, so as not to be capable of coming into contact with the surrounding medium.

The centrifuge 22 is installed beside the reactors 1. The two base plates 56 and 64 can be installed side by side and so as to permit a communication between the various receptacles via the above-mentioned conduits.

It is to be understood that the present invention is not limited in any way to the embodiments described above and that many modifications can be introduced without departing from the scope of the claims hereinafter.

It is possible, for example, that the plant can undertake the treatment of waste containing asbestos which is already bagged and abandoned in a depot, or waste of the mat, felt or similar type. In this case, it may be advantageous to make provision for mechanical shredding of the waste. This can take place in accordance to the invention inside the reactor 1, by introducing some fragments of stainless steel into it. It is also possible to provide the inner surface of the reactor with shredding devices, for example in the form of small hooks.

Figure 6:
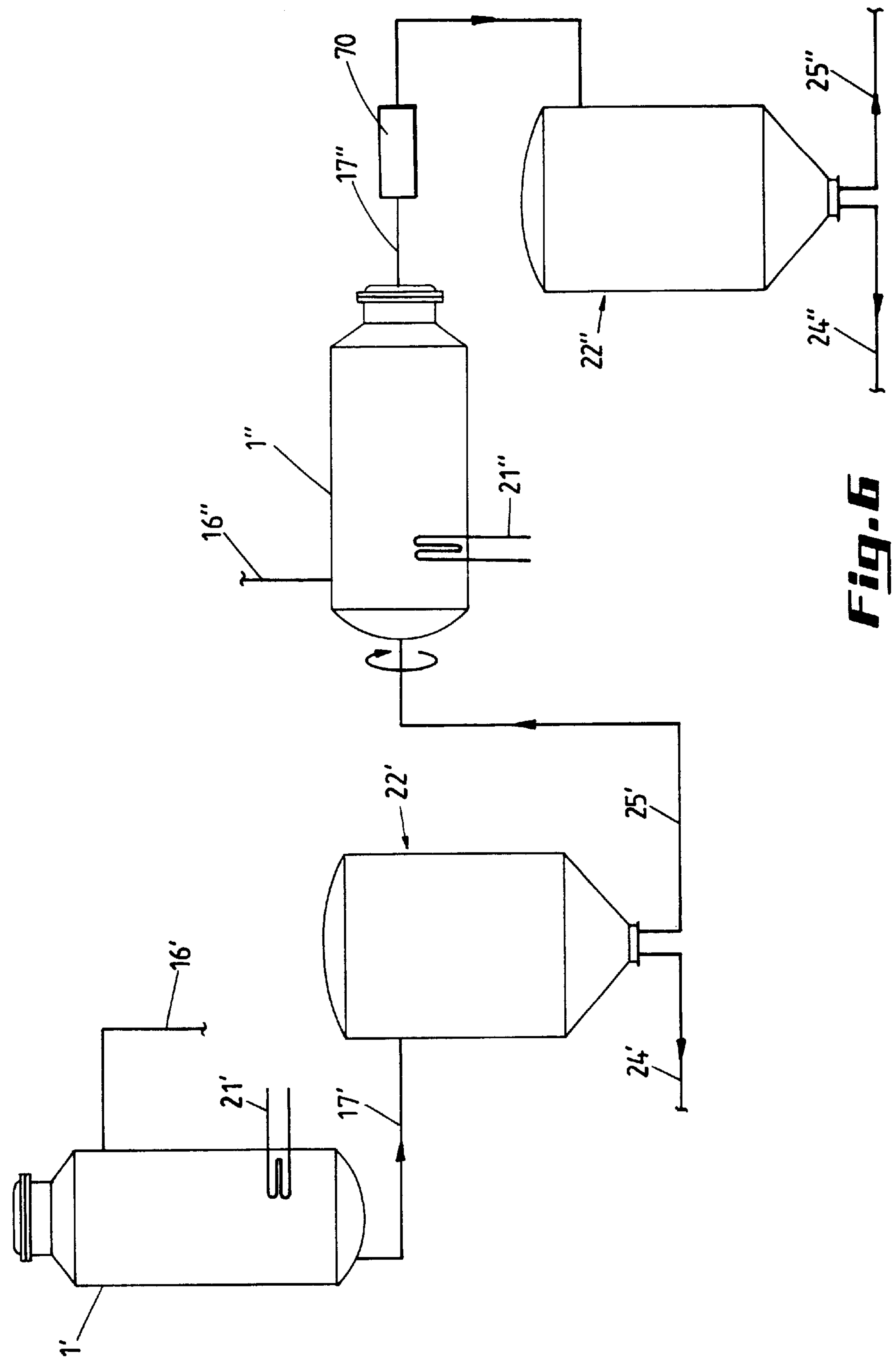
FIG. 6 shows diagrammatically, in combination with FIGS. 1 and 3, an alternative form of embodiment of a treatment plant in accordance with the invention.

An improved alternative embodiment of the plant in accordance with the invention has been illustrated in FIG. 6, where the reactor 1, formed by a high-pressure autoclave of the plant in accordance with FIGS. 1 and 3 is replaced with two successive reactors: 1) a removable reactor 1', for example in the form of an autoclave of small size and capable of operating at an extremely moderate pressure and 2) a stationary reactor 1". Autoclaves corresponding to the requirements of the removable reactor 1' are those commonly employed in chemistry laboratories, and are readily available on the market at a moderate cost. These autoclaves have the additional advantage of being capable of being much less heavy and less pressure-resistant, because of the low pressure used.

The waste containing asbestos is introduced into the reactor 1' as into the reactor 1 of FIG. 1, and this reactor is advantageously washed in the same way on leaving the site which generates waste. It is then connected to an upper conduit 16' which allows it to be brought into communication with the vessel 29 for preparation of the basic digestion solution.

It is known that a 100% (25 molar) solution of NaOH causes a release of steam only starting at 180° C. If a temperature lower than this is maintained in the reactor 1' by heating element 21', the pressure does not increase appreciably in the reactor 1', whereas the action of the soda allows the various solid waste to be disassociated. The asbestos waste originating from flocking or from industry is initially in a form of wadding whose specific weight is between 150 and 300 g per liter, which results in a large bulk to be treated with little asbestos removal.

Provision is made, for example, for a treatment of the waste in the reactor 1' with the basic digestion solution at a temperature of 160 to 175° C., advantageously of 170° C., for 15 minutes.

The reaction product is then transferred via a conduit 17' to a first centrifuge 22', where the liquid phase is separated from the solid phase. The liquid phase, which does not contain asbestos, is recycled via the conduit 24' to the preparation vessel 29 or the equalization vessel 42.

The solid phase is in the form of a paste (i.e., a pasty solid phase) which still contains asbestos fibers which are completely disassociated. After analysis, it has already been possible to estimate that, in this state, the fibers obtained no longer represent any hazard to human health. This solid phase now has a volume which is reduced by 70% in relation to that introduced into the reactor 1'. It is brought, via a conduit 25', to the reactor 1". The latter is a stationary reactor, that is to say one which no longer needs to be moved towards the site which generates waste, and is nevertheless small in volume. Provision may be made for it to be arranged horizontally, with a view to being driven in rotation about a horizontal axis.

The basic digestion solution is introduced via the conduit 16", and a temperature higher than 180° C., for example from 190 to 210° C., advantageously from approximately 200° C., is maintained in the reactor 1" by a source of heat 21". Decomposition and complete disappearance of the asbestos fibers then take place, and a pressure forms within the reactor. However, as the treated volume of solid phase is reduced, a pressure of 2.5 kg to 10 kg/cm$^2$, preferably from 2.5 to 5 kg/cm$^2$ can suffice.

The reaction product is then transferred into a second centrifuge 22" via the conduit 17", by passing through a cooling device 70. Here, the temperature of the product originating from the reactor 1" is lowered below the temperature at which the soda is vaporized, that is, to say approximately 180° C. In this centrifuge, separation of the liquid phase and of the solid phase takes place. The liquid phase is recycled via the conduit 24" towards the vessels for preparation and/or equalization of the basic digestion solution, and the solid phase is taken via the conduit 25" to the trough 26.

Like the conduit 16 in FIG. 2, the conduits 16' and 16" can be used as means for recycling the gas mixture originating from the corresponding reactor towards the source of basic digestion solution.

To summarize, some main advantages of the process and of the plant in accordance with the invention are (a) safety is increased by the elimination of transport between a generating site and a treatment plant and by the absence of any packaging of the waste, which avoids any hazard due to tearing of the bags; (b) the closing and washing of the reactors before they leave the sites which generate asbestos, and the absence of reopening of the reactors before destruction of the asbestos; (c) there is simplicity of use; (d) there is the absence of the need to sort, to grind or to crush the rubble to be introduced into the reactors; (e) there is a complete destruction of the asbestos fibers at a relatively low cost and (f) there is a reclaiming of materials which become marketable and recycling of liquids and gases, which avoids any discharge into the air or any removal to drains or into the soil.

The foregoing is a complete description of the present invention, but it must be understood and appreciated that various changes and modifications may be made by those skilled in the art. The invention, therefore, should be limited only by the scope of the following claims.

What is claimed is:

1. A process for the treatment of waste containing asbestos, originating from a site generating such waste, including the steps of:

a. transferring the waste containing asbestos from the generating site to the interior of a movable treatment reactor, said step being carried out within said site;

b. moving the treatment reactor from the interior of the site to a location which is exterior of the site;

c. treating the waste containing asbestos with a basic digestion solution in said movable treatment reactor to disassociate the fibres containing asbestos from the remainder of the waste;

d. separting the waste treated in step c into a solid phase, which contains the disassociated fibres and which is of pasty consistency, and a liquid phase;

e. transferring at least the solid phase including the disassociated asbestos fibres to a second reactor; and f. adding a basic digestion solution to said second reaction and mixing said basic digestion solution with said solid phase containing disassociated asbestos fibres until a reaction product is obtained which is of pasty consistency and substantiaolly without asbestos fibres;

wherein steps a–f occur in a circuit without any outward release of asbestos fibres and any product resulting from the circuit is substantially devoid of any asbestos fibre.

2. A process for the treatment of waste containing asbestos, originating from a site generating such waste, including the steps of:

a. transferring the waste containing asbestos from the generating site to the interior of a treatment reactor, said step being carried out within said site;

b. adding a basic digestion solution to said reactor while said reactor is located within said site;

c. mixing said waste with the basic digestion solution until a reaction product is obtained which is of pasty consistency and substantially without asbestos fibres;

d. separating the reaction product into a solid phase and a liquid phase;

e. recycling said liquid phase back to said reactor as at least part of the basic digestion solution;

f. recovering said solid phase; and g. discharging a small quantity of nonrecoverable waste containing no asbestos fibres from the reactor;

wherein steps a–g occur in a circuit without any outward release of asbestos fibres and any product resulting from said circuit is substantially devoid of any asbestos fibres.

3. A process for the treatment of waste containing asbestos, originating from a site generating such waste, including the steps of:

a. transferring the waste containing asbestos from the generating site into the interior of a movable receptacle, said step being carried out within said site; said movable receptacle having an opening to receive said waste, said opening adapted to be tightly closed;

b. tightly closing said opening;

c. moving said movable receptacle so that the asbestos containing waste enters a reactor;

d. opening said movable receptacle so that the asbestos containing waste enters the reactor;

e. adding a basic digestion solution to the reactor;

f. mixing said waste with the basic digestion solution until a reaction product is obtained which is of pasty consistency and substantially without asbestos fibres;

g. separating the reaction product into a solid phase and a liquid phase;

h. recycling said liquid phase back to the reactor as at least part of the basic digestion solution;

i. recovering said solid phase; and j. discharging a small quantity of nonrecoverable waste containing no asbestos fibres from the reactor;

wherein steps a–j occur in a circuit without any outward release of asbestos fibres and any product resulting from said circuit is substantially devoid of any asbestos fibres.

* * * * *